United States Patent [19]
Friberg et al.

[11] Patent Number: 5,208,586
[45] Date of Patent: May 4, 1993

[54] ULTRASONIC VEHICLE POSITIONING APPARATUS AND METHOD

[75] Inventors: Nathan J. Friberg, 10545 Maryland Cir., Bloomington, Minn. 55438; Charles A. Boulos, Milford, Mass.

[73] Assignee: Nathan J. Friberg, Bloomington, Minn.

[21] Appl. No.: 655,770

[22] Filed: Feb. 14, 1991

[51] Int. Cl.$^5$ ............................................. G08G 1/14
[52] U.S. Cl. .................................. 340/932.2; 340/943
[58] Field of Search .............. 340/932.2, 435, 436, 340/903, 958, 943

[56] References Cited

U.S. PATENT DOCUMENTS

| | | | |
|---|---|---|---|
| 3,329,932 | 7/1967 | Auer, Jr. | 340/943 |
| 3,362,009 | 1/1968 | Midlock | 340/943 |
| 3,431,550 | 3/1969 | Spence | 340/943 |
| 3,435,405 | 3/1969 | Persson | 340/943 |
| 3,820,065 | 6/1974 | Koplewicz et al. | 340/932.2 |
| 4,101,868 | 7/1978 | Bubnich et al. | 52/743 |
| 4,145,681 | 3/1979 | Bubnich et al. | 340/932.2 |
| 4,187,487 | 2/1980 | Numata | 340/943 |
| 4,288,777 | 9/1981 | Luik | 340/932.2 |
| 4,311,983 | 1/1982 | Piper | 340/932.2 |
| 4,318,077 | 3/1982 | Bubnich et al. | 340/932.2 |
| 4,341,488 | 7/1982 | Ryan | 340/932.2 |
| 4,467,313 | 8/1984 | Yoshino | 340/943 |
| 4,665,378 | 5/1987 | Heckethorn | 340/932.2 |
| 4,694,295 | 7/1987 | Miller | 340/435 |
| 4,808,997 | 2/1989 | Barkley et al. | 340/932.2 |
| 4,870,413 | 9/1989 | Walden et al. | 340/932.2 |
| 4,908,617 | 3/1990 | Fuller | 340/932.2 |

OTHER PUBLICATIONS

Polaroid Sonar One Step SX-70 Land Camera, brochure, no date available.
Humminbird Depth Sounder Operations Manual, cover & p. 5, no date available.
Micronta Electronic Tape Measure, brochure, 1989.

Primary Examiner—Jin F. Ng
Assistant Examiner—Christine K. Oda
Attorney, Agent, or Firm—James W. Miller

[57] ABSTRACT

An apparatus for helping a vehicle operator park or otherwise spot a vehicle at a pre-determined vehicle location. The apparatus includes an ultrasonic pulse generator and receiver which sends a succession of ultrasonic sound pulses into a target area and receives echoes reflected from the vehicle and the surrounding environment. A control circuit then determines from these echoes whether the vehicle has reached its pre-determined vehicle spot. If it has, then at least one alarm is sounded to alert the operator to this fact and allow the vehicle to be brought to a halt.

23 Claims, 7 Drawing Sheets

ULTRASONIC VEHICLE POSITIONING APPARATUS AND METHOD

TECHNICAL FIELD

This invention relates to apparatus which precisely detects when a vehicle has reached a pre-determined vehicle spot and which activates an alarm to alert the vehicle operator to that fact to assist the operator in parking or otherwise positioning the vehicle in the pre-determined vehicle spot, and to a method of using such an apparatus. More particularly, the present invention relates to such an apparatus and method which further utilize ultrasonic sound pulses and echo detection of such sound pulses in determining when the vehicle has reached the pre-determined vehicle spot.

BACKGROUND OF THE INVENTION

It is a common problem to park or otherwise position a vehicle accurately within the limited confines of a typical residential garage. Accurate positioning is necessary to prevent the front of the vehicle from hitting the end wall, or objects placed on or along the end wall, as the vehicle is being driven into the garage. It is also often necessary to have adequate clearance in front of the vehicle for walking between the end wall and the vehicle while retaining some clearance at the rear of the vehicle so the overhead garage door can close without hitting the vehicle. It is inconvenient, at a minimum, to have to exit the vehicle to check clearances before closing the overhead garage door, and can be a potentially serious security risk when the garage is located in an area that is susceptible to crime.

A similar positioning problem exists when backing boats, camping trailers, and other recreational vehicles into parking stalls or when backing semi-tractor trailers and other industrial vehicles up to loading docks. In each case, it is necessary to position the trailered vehicle close to, while avoiding contact with, adjacent objects. In yet another application, it is necessary for forklift operators to place palletized loads close to walls and other obstacles without coming into contact with them.

Some devices are known which assist the operator in parking or positioning a vehicle. These devices are generally of a simple mechanical type that require the vehicle to contact a mechanical element, such as an arm, a lever, a switch, a post, a ball, etc., which then can be used to actuate an alarm. Devices of this type, while effective in the positioning of vehicles, are cumbersome and awkward, often invading floor and walking space around the vehicle. In addition, they are difficult to adjust, requiring tools, and prone to tampering by children because of their close proximity to the vehicle.

U.S. Pat. No. 4,808,997 to Barkley discloses a ceiling mounted device that emits a downward beam of light, a portion of which is reflected by the floor back to the device, producing a corresponding electrical signal. When a vehicle intercepts the beam, it theoretically produces a substantial change in the amount of reflected light to the device resulting in an electrical signal change, thus triggering an alarm device. In practice, however, variables including the reflective qualities of the vehicle, such as the surface finish condition and the angle of the vehicle surface which intercepts the light beam, may result in an insufficient change in the amount of reflected light necessary to trigger the alarm.

SUMMARY OF THE INVENTION

Accordingly, it is one aspect of this invention to solve the problem of accurately positioning a vehicle, in a wide variety of applications, by providing a new ultrasonic positioning device that is reliable and accurate, simple to install, adjust, and operate, and which does not obstruct the floor or walking space.

An apparatus according to this invention helps the operator of a movable vehicle to park or otherwise position that vehicle in a desired pre-determined spot within a target area. The apparatus comprises at least one alarm which is discernible to the vehicle operator when the alarm is actuated. Means are provided for actuating the alarm when the vehicle reaches the pre-determined vehicle spot. The alarm actuating means includes means for generating a succession of pulses of sound energy and for directing the sound pulses into the target area and towards the pre-determined vehicle spot, means for detecting pulse echoes which are reflected from the target area including pulse echoes reflected from a vehicle being moved into the target area by the operator, and control means responsive to the reflected echoes received by the detecting means for determining when the vehicle has reached the pre-determined vehicle spot and for actuating the alarm in that event.

BRIEF DESCRIPTION OF THE DRAWINGS

The present invention will be described hereafter in the Detailed Description, when taken in conjunction with the following drawings, in which like reference numerals refer to like elements throughout.

DETAILED DESCRIPTION

Figure 1:
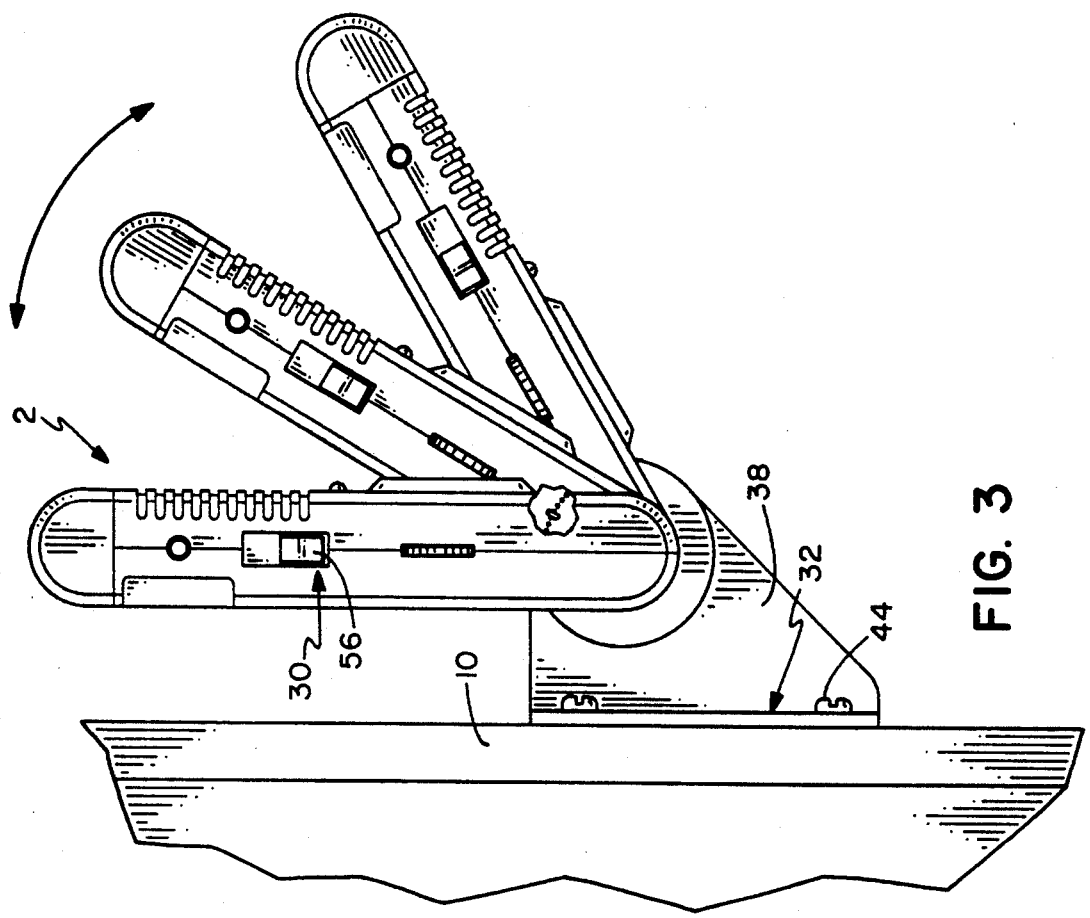
FIG. 1 is a perspective view of a Vehicle Positioning Apparatus according to the present invention, particularly illustrating the various externally visible elements of the apparatus.
Figure 3:
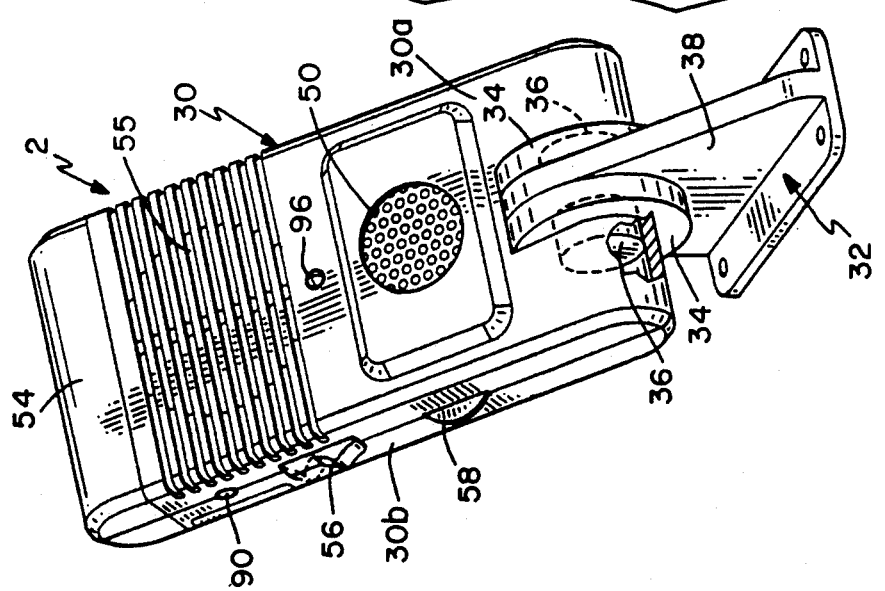
FIG. 3 is a close-up side elevational view of the Vehicle Positioning Apparatus shown in FIG. 1, particularly illustrating the mounting and positioning of the apparatus on a vertical garage wall.
Figure 6:
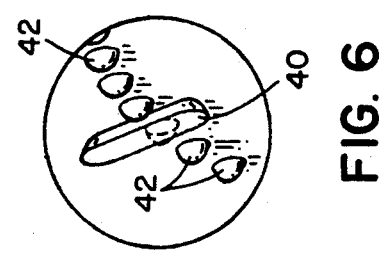
FIG. 6 is an enlarged perspective view of a portion of the Vehicle Positioning Apparatus of FIG. 1, particularly illustrating the detent means for holding the housing in an adjusted position.
Figure 2:
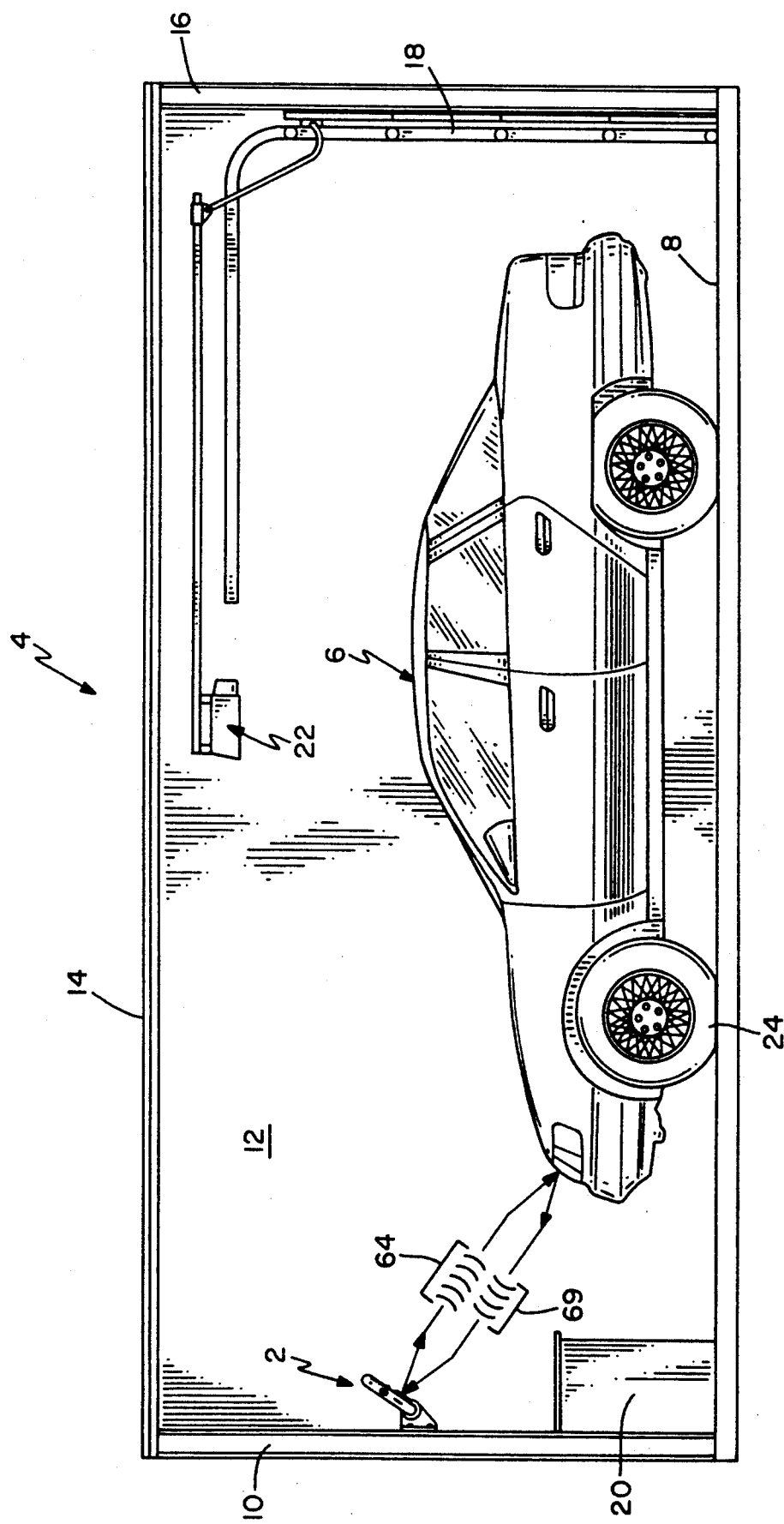
FIG. 2 is a side elevational view of the Vehicle Positioning Apparatus of FIG. 1, particularly illustrating the typical placement of the apparatus, relative to the vehicle, within a residential garage.

Referring first to FIGS. 1-3, a first embodiment of a Vehicle Positioning Apparatus, according to the present invention, is generally illustrated as 2. Apparatus 2 is shown installed in a typical residential garage 4 used primarily to shelter movable vehicles 6, such as the automobile illustrated in FIG. 2. Garage 4 typically includes a floor 8, an end wall 10, two side walls 12 one of which is shown in FIG. 2, a roof or overhead closure 14 and another end wall 16 having an entrance opening closed by a garage door, such as the sectional door 18 illustrated in FIG. 2. It is common for work benches, storage cabinets, and other objects 20, such as bicycles, lawnmowers, etc., to be placed around the periphery of garage 4 including against end wall 10.

As is well known, garage door 18 first has to be opened by the operator of vehicle 6, either by hand or by using a remotely actuated automatic garage door opener 22 of conventional design, before vehicle 6 can be driven into and parked in garage 4. It is desirable and necessary to accurately park vehicle 6 close to, while avoiding contact with, end wall 10 or any objects 20 normally placed in front of end wall 10. In addition, it is also often desirable to leave adequate walking or work space between end wall 10 or objects 20 and the front of vehicle 6 while maintaining sufficient clearance at the rear end of vehicle 6 to allow garage door 18 to close without hitting vehicle 6.

Accordingly, vehicle 6 is desirably located in a position or spot inside garage 4 which accomplishes the spacing objectives noted above and which will be referred to herein as the pre-determined vehicle spot. FIG. 2 illustrates vehicle 6 positioned at one pre-determined vehicle spot, illustrated herein as 24, contained within a larger space comprising the interior of garage 4. This larger space will be referred to herein as the target area.

Apparatus 2 assists the operator of vehicle 6 by alerting the operator when vehicle 6 reaches the pre-determined vehicle spot as it is being driven into the target area. However, apparatus 2 is not limited for use with an automobile that is being parked in a garage, but can effectively be used to help locate any type of movable vehicle in a pre-determined vehicle spot. Thus, apparatus 2 could be used adjacent a loading dock to help position semi-trailers at the dock without hitting the dock, or in a warehouse along walls to help forklift operators position their forklifts relative to the wall, or at an airport to assist pilots in parking their aircraft at gates, etc.

Referring now to FIGS. 1 and 3, the Vehicle Positioning Apparatus 2 of this invention comprises a housing 30 which encloses the various functional elements of apparatus 2, which elements will be described hereafter. Housing 30 is rotatably journaled on a mounting bracket 32 using any suitable pivot structure. For example, cylindrical bosses 34 are preformed on two separate housing halves 30a and 30b which bosses 34 receive pivot pins 36 carried on a flange 38 of bracket 32 when the housing halves are secured together in a suitable manner. Housing 30 can be adjustably held in different positions relative to mounting bracket 32 through a detent rib 40 on one or both of the bosses 34 which cooperates with an arcuate set of detent bumps 42 located on mounting bracket flange 38. Other means for locking housing 30 in place on bracket 32, or for pivotally mounting housing 30 on bracket 32, could be used and would constitute equivalents to what is shown herein.

Mounting bracket 32 is secured to end wall 10 of garage 4 using screws 44 or other suitable fasteners. As shown in FIG. 2, mounting bracket 32 is preferably located on end wall 10 substantially above the level of garage floor 8 and above any objects 20 placed in front of end wall 10. Housing 30 is usually angled slightly downwardly relative to mounting bracket 32 to point into the target area and towards the pre-determined vehicle spot, though almost any housing angle and mounting position combination could be used. Thus, housing 30 does not intrude into the garage space, is not placed in a location where it is prone to being struck and damaged, and is resistant to tampering. Moreover, the orientation of housing 30 can be quickly and easily adjusted merely by grabbing housing 30 and rotating it by hand to numerous adjusted positions, several of which are illustrated in FIG. 3. This allows apparatus 2 to be easily adjusted, without tools, to precisely aim apparatus 2 directly at a surface of vehicle 6 (FIG. 2) for optimum performance, as will be described hereafter.

A Vehicle Positioning Apparatus 2, according to the present invention, uses ultrasonic sound waves for accurate and reliable vehicle detection and positioning purposes. In this regard, housing 30 carries a tuned ultrasonic transducer unit 50, of any conventional type with one suitable unit being Type C-40 or C-40P manufactured by Nippon Ceramics, capable of both generating and receiving ultrasonic sound pulses. Alternatively, two ultrasonic transducers 50 could be substituted for the single transducer shown herein and still be covered by the present invention. In this latter case, one of the transducers 50 would only send ultrasonic waves, while the other transducer 50 only receives ultrasonic sound waves.

In addition to transducer 50, housing 30 contains an alarm means 53 which is discernible to the operator of vehicle 6 when the alarm means is actuated. Alarm means 53 includes a light source 54, e.g. a highly visible red light, and an audible and preferably loud bell, beeper or horn 55. When apparatus 2 detects that vehicle 6 is located in the pre-determined vehicle spot using the ultrasonic detection method to be detailed hereafter, it simultaneously actuates light 54 and sounds horn 55 to alert the vehicle operator to this fact. The operator is then informed that vehicle 6 is properly positioned at the pre-determined vehicle spot, and can bring vehicle 6 to a halt. While two separate alarms 54 and 55 preferably comprise alarm means 53, only one alarm is necessary for this purpose.

Figure 4A:
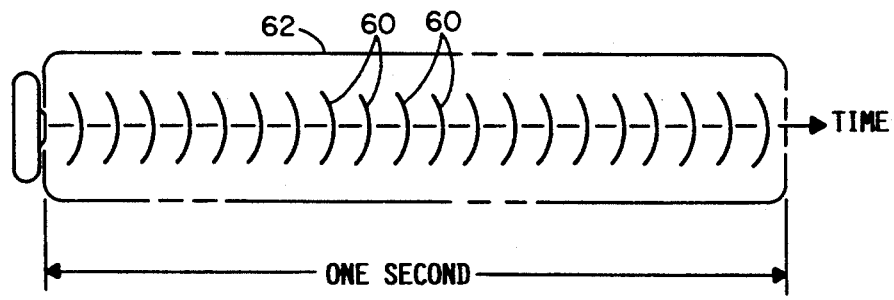
FIGS. 4A-4F are a series of diagrammatic and side elevational views depicting the method of use of the Vehicle Positioning Apparatus of FIG. 1, particularly the use of ultrasonic sound pulses for detecting vehicle position within the scope of this invention.
Figure 4B:
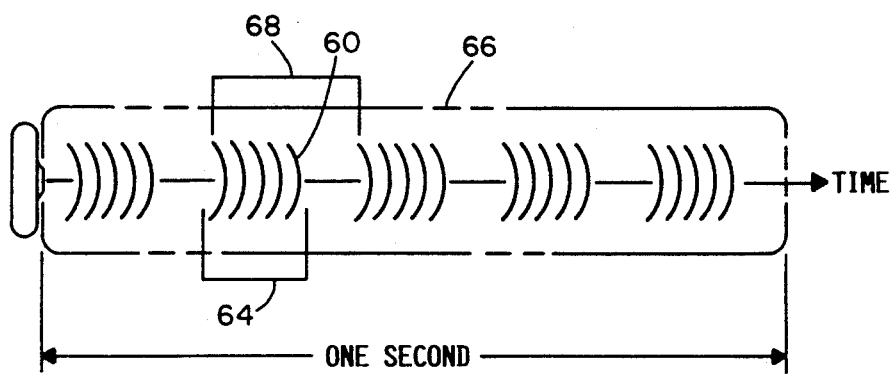
Figure 4C:
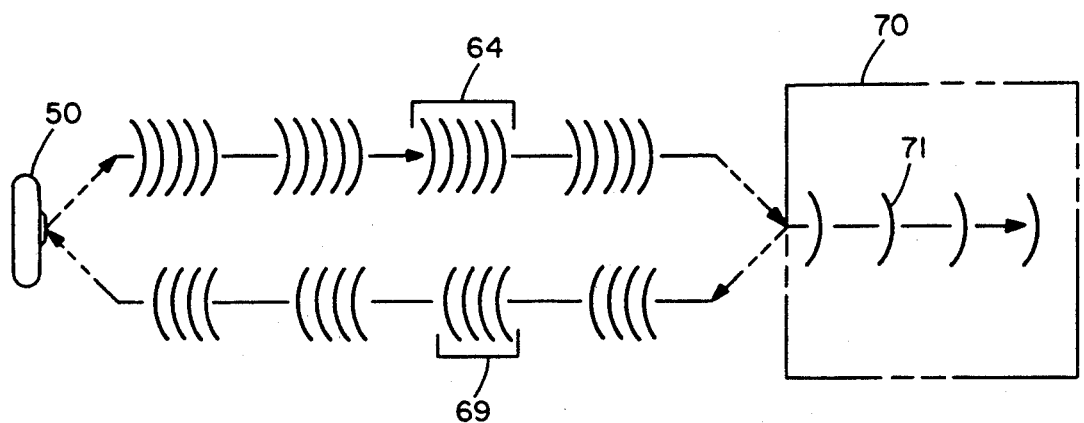

FIGS. 4A–4C explain ultrasonic technology generally. Referring to FIG. 4A, ultrasonic sound waves have frequencies above the range of human hearing, i.e. frequencies typically greater than 20,000 hertz. One hertz equals one ultrasonic sound wave cycle 60 (vibration) per second. Ultrasonic frequency 62 refers to the total number of sound wave cycles 60 produced per second. Thus, a frequency of 20,000 hertz means that 20,000 sound wave cycles occur in one second.

Referring to FIG. 4B, a cluster or group of ultrasonic sound wave cycles 60, separated by a time interval, is called an ultrasonic sound pulse 64. The number of times per second that a pulse 64 is transmitted is called the pulse repetition rate 66. The time between corresponding points of successive pulses 64 is called pulse spacing or pulse interval 68. Thus, as the pulse repetition rate 66 decreases, i.e. fewer pulses per unit time, the pulse interval 68 increases proportionately.

Referring to FIG. 4C, ultrasonic transducer unit 50 is used to convert electrical signals into pulses 64 of ultrasonic energy, and simultaneously, to convert the reflected echo energy 69 back into electrical signals. When sound energy strikes an object, such as the one illustrated as 70, most if it is reflected back (illustrated as 69), while some of it is absorbed (illustrated as 71) into object 70 and the surrounding environment. As the speed of sound in air is generally a constant, measuring 1,085 ft/sec, one can accurately determine the distance to object 70 by measuring the time lag required for the pulse 64 to travel from its source to the point of reflection and return as echo 69.

Figure 4D:
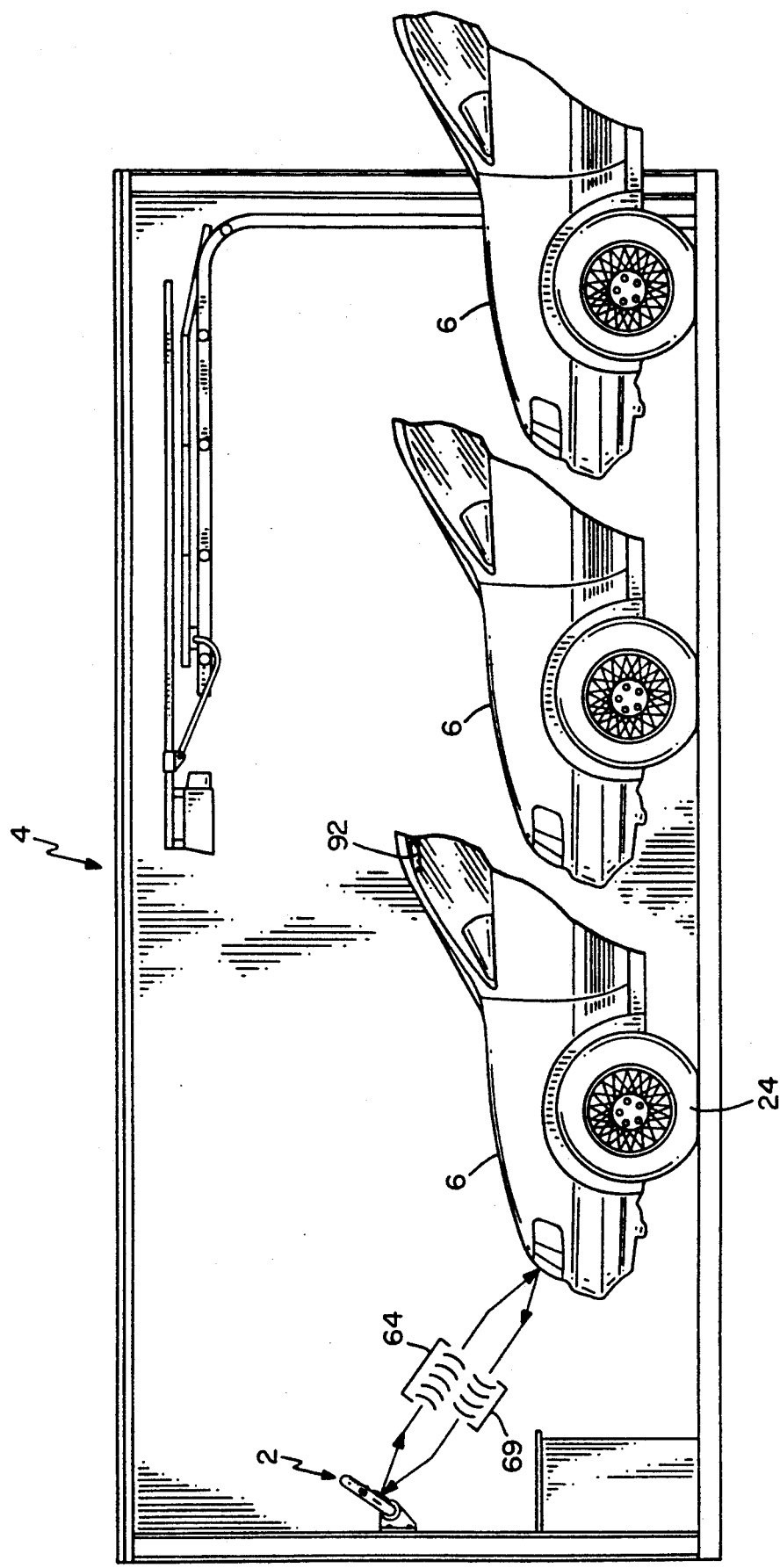
Figure 4E:
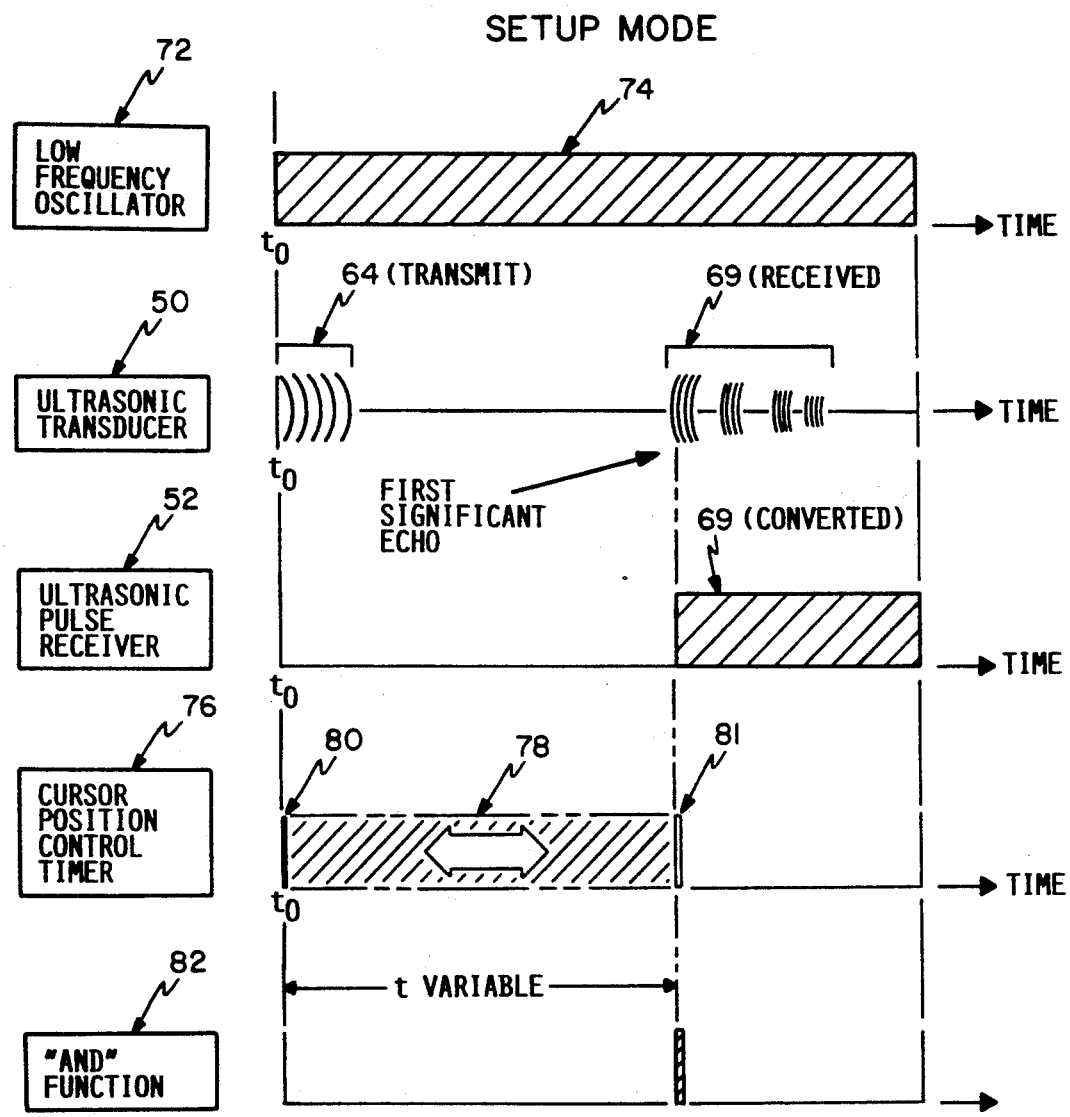
Figure 4F:
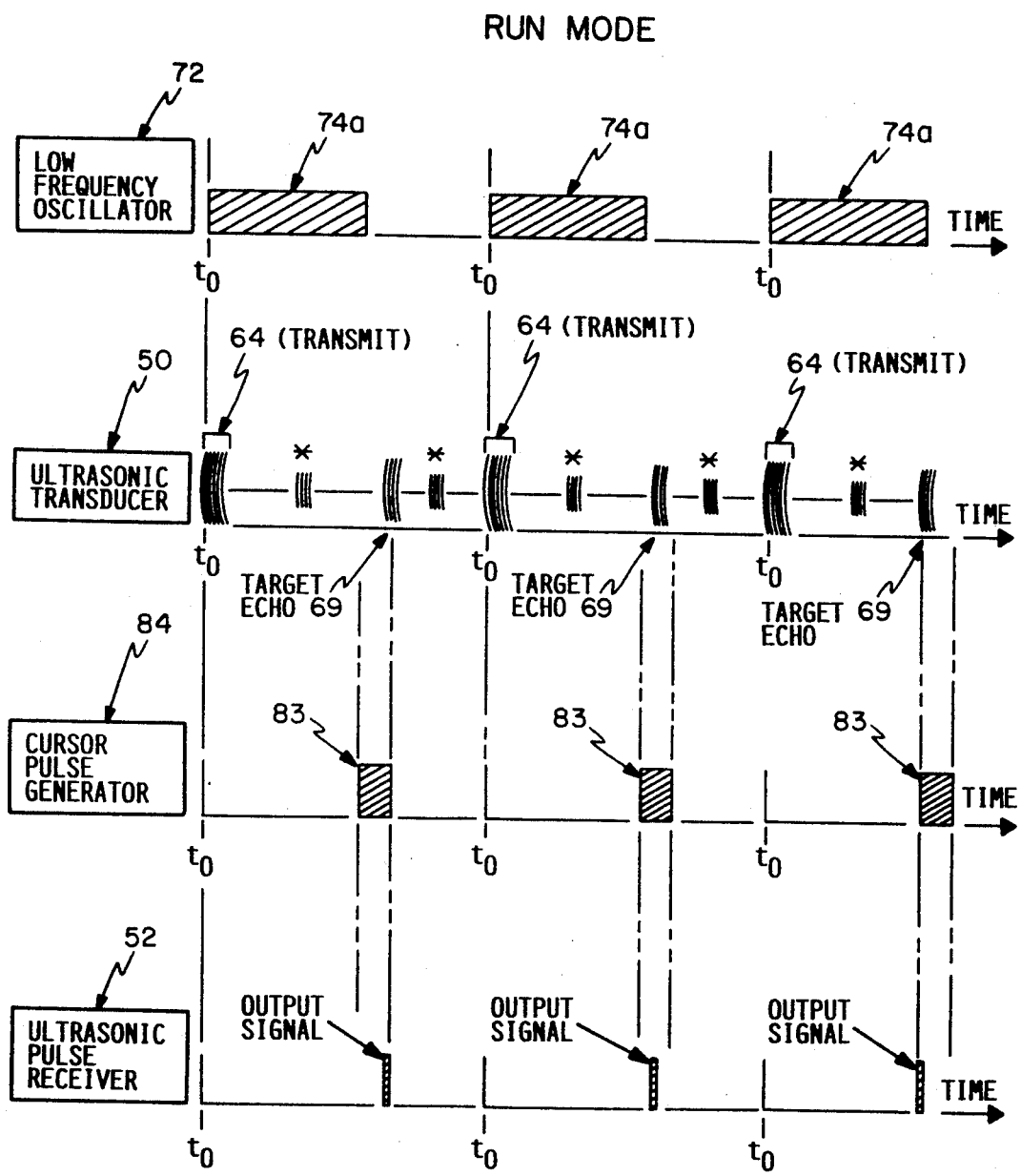
Figure 5:
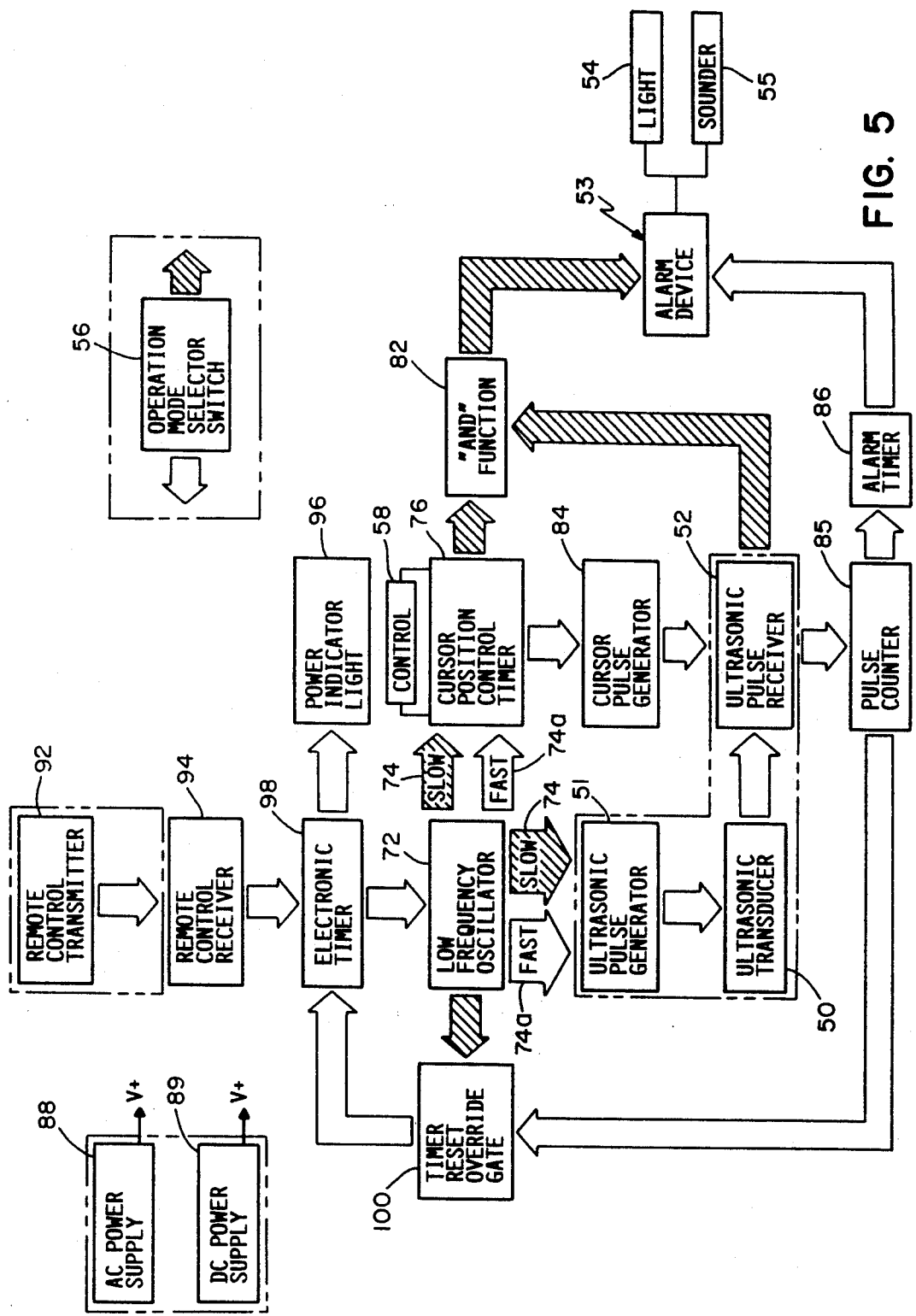
FIG. 5 is a schematic block diagram, particularly illustrating the functional steps used in practicing the method illustrated in FIGS. 4A-4F.

FIGS. 4D–4F will be used, in conjunction with FIG. 5, to explain how apparatus 2 uses ultrasonic sound pulses to detect vehicle position and to actuate alarm means 53 when the pre-determined vehicle spot is reached.

The Setup Mode

Apparatus 2 includes means for storing or remembering a pre-determined vehicle spot and to allow that stored value to be selectively changed when desired by the operator. Referring to FIG. 4D, vehicle 6 is first carefully positioned in the exact pre-determined vehicle spot desired by driving vehicle 6 into garage 4 and locating it in that spot 24. Next, referring to FIGS. 1 and 5, a switch 56 is actuated by the operator to move from a "run" position in which apparatus 2 is in a "run" mode to a "setup" position in which apparatus 2 is in a "setup" mode. The run position of switch 56 is shown in solid lines in FIG. 1 with its setup position being shown in phantom lines. Certain arrows in FIG. 5 are cross-hatched to indicate operation of apparatus 2 in the setup mode with the other non-crosshatched arrows showing operation in the normal run mode.

In the "setup" position of switch 56, a low frequency oscillator 72 is powered and converts electrical impulses into repetitive "initiate transmit signals" 74 at a low repetition rate. This low repetition rate is preferred during "setup" to more effectively "lock-on" to the true target by recognizing only the first significant echo received from each ultrasonic pulse transmission. All subsequent echoes are ignored and decay away before the next ultrasonic pulse is transmitted. However, this invention contemplates that the "initiate transmit signal" repetition rate may be generated at any frequency in the setup mode.

Referring to FIG. 5, the "initiate transmit signals" 74 are simultaneously delivered to the ultrasonic pulse generator 51 and to a cursor position control timer 76. The ultrasonic pulse generator 51 fires each time an "initiate transmit signal" 74 is received, causing the ultrasonic transducer 50 to convert the electrical energy into pulses 64 (FIG. 4D) of ultrasonic sound waves. The ultrasonic pulses 64 (FIG. 4D) are reflected by vehicle 6 (FIG. 4D) back to the ultrasonic transducer 50 (FIGS. 4E and 5) as echoes 69. The ultrasonic transducer 50 then converts the first significant echo 69 (FIG. 4E) into an electrical signal which is delivered to the ultrasonic pulse receiver 52. The ultrasonic pulse receiver 52 then generates an electrical signal at the point in time when the input signal is received from the ultrasonic transducer 50, and applies that signal to one input port of AND gate 82. See FIG. 5.

Referring to FIG. 5, AND gate 82 has means to deliver an output signal only if and when signals are simultaneously received on both input ports. The other input port signal of the AND gate 82 is supplied by the cursor position control timer 76. Referring to FIGS. 4E and 5, the cursor position control timer 76 is a variable timer circuit having means to delay the output signal with respect to the input "initiate transmit signal" 74. The amount of the delay is manually set by manually adjusting the setting of the timer circuit through a user adjustable, e.g. a thumbwheel, control 58 on the side of housing 30. See FIGS. 1 and 5. This allows the output signal from the cursor position control timer 76 to be synchronized with the output signal from the ultrasonic pulse receiver 52 which supplies the other input port signal to the AND gate 82.

Signal synchronization is accomplished by first rotating control 58 to its fully counter-clockwise position, which moves an electronic time line 78, within cursor position control timer 76, to its fully leftside position shown as 80 in FIG. 4E. In this position, there is zero output time delay to the input "initiate transmit signal" 74 received from the low frequency oscillator 72. As control 58 is slowly rotated clockwise, the input "initiate transmit signal" 74 is proportionately delayed, moving the electronic time line 78 to the right until it is synchronized (time line position 81) with the time the first significant ultrasonic echo 69 is received by ultrasonic transducer 50. At this position of control 58, both input signals to the AND gate 82 are synchronized producing an output signal from the AND gate which energizes the alarm means 53 (FIG. 5). Thus, the operator is alerted to the fact that apparatus 2 has "learned" the pre-determined vehicle spot which is, in fact, stored as the reference pulse/echo time through the position of control 58.

The Run Mode

The operation mode selector switch 56 can now be placed in the "run" position. Apparatus 2 is now ready for normal operation. The low frequency oscillator 72, in the "run" mode, produces "initiate transmit signals" 74a at a high repetition rate, typically 20 ultrasonic pulses 64/second. This is preferred in order to detect a moving vehicle 6 within a brief time interval. However, this invention contemplates broadly that the "initiate transmit signals" 74a may be generated at any frequency in the run mode.

Referring to FIGS. 4F and 5, the low frequency oscillator 72 delivers the "initiate transmit signals" 74a simultaneously to the ultrasonic pulse generator 51 and the cursor position control timer 76, as in the "setup" mode. The ultrasonic pulse generator 51 fires each time an "initiate transmit signal" 74a is received, causing the ultrasonic transducer unit 50 to generate an ultrasonic sound wave pulse 64 (FIG. 4D). The cursor position control timer 76, which receives an "initiate transmit signal" 74a at the same time as the ultrasonic pulse, generator 51, then delays the "initiate transmit signal" 74a for the reference pulse/echo time interval (time line position 81-FIG. 4E) programmed in the "setup" mode before delivering a triggering signal to a cursor pulse generator 84. The cursor pulse generator 84 then fires sending an output signal 83 which enables, e.g. gates the output of, the ultrasonic pulse receiver 52 only for the duration of the output signal 83. In effect, the cursor pulse generator 84 intermittently activates the ultrasonic pulse receiver 52 for a relatively short time window, indicated as 83 in FIG. 4F, which window opens beginning at or shortly before the reference pulse/echo time so that time line 81 (FIG. 4E) is included within each window 83.

Ultrasonic pulse receiver 52 when enabled will listen for converted sound wave echosignals received from ultrasonic transducer 50. If such a signal is detected by receiver 52 during the time the ultrasonic pulse receiver 52 is enabled, an output signal is produced by the receiver 52. Occasionally, a deflected echo from a previous sound pulse 64, and not from the most recent pulse 64, will arrive at receiver 52 during the time window 83 in which ultrasonic pulse receiver 52 is enabled to listen for converted echo energy from the most recent pulse. Such deflected or random erroneous echoes 69 are identified by asterisks in FIG. 4F. This would cause an erroneous output signal if alarm means 53 were to be activated.

To avoid a false triggering of the alarm means 53, the ultrasonic pulse receiver 52 is required to deliver all output signals to a pulse counter 85 having means to record the total number of signals received during a specific time interval. In this embodiment, the pulse counter 85 is required to receive multiple consecutive output signals, preferably three such signals, from the ultrasonic pulse receiver 52 within the time interval of a corresponding number of consecutive initiate transmit signals 74a from the low frequency oscillator 72 before sending an output signal to the alarm timer 86, which then energizes alarm means 53 for a timed interval to alert the operator that vehicle 6 is in its pre-determined vehicle spot.

Apparatus 2 of this invention may be operated from either or both AC and DC power sources 88 and 89, respectively. Referring to FIGS. 1 and 5, an external power supply jack 90 (FIG. 1) allows apparatus 2 to be connected to an external AC electronic power supply 88 (FIG. 5) for the purpose of converting normal AC line current into the proper DC voltage necessary to operate the apparatus circuits. Alternatively, the AC power source 88 may be located internal to apparatus 2 employing a standard line cord. An internal DC power supply 89, having means to supply the direct voltage necessary to operate the circuits, allows operating apparatus 2 independent of outside power sources, thus providing unrestricted portability.

The method of intermittently operating the pulse receiver for a time window which includes the reference pulse/echo time and for determining if a sound pulse echo is received by the transducer during that window is an indirect indication of whether the actual pulse/echo times are equal to the reference pulse echo/time, which indirect indication is nonetheless useful for the purposes of this invention. Alternatively, it would be possible to start a timer each time a sound pulse is generated, at time $t_0$ in FIG. 4F, and directly measure how long it takes for a sound pulse echo to be received by the transducer. This direct time measurement could then be compared in a comparator to the reference pulse/echo time $t_0$ cause alarm activation when the two are equal. However, this direct time measurement implementation of the present invention is not preferred compared to the indirect implementation disclosed herein.

The Standby Mode and Remote Actuation

Vehicle Positioning Apparatus 2, according to the present invention, includes means to activate apparatus 2 from a remote location. Referring to FIGS. 4D and 5, a wireless infrared or radio frequency remote control apparatus 92 can be mounted within vehicle 6 for this sole purpose.

The remote control apparatus 92, operating from its own power source, is manually activated as vehicle 6 approaches the target area, i.e. as vehicle 6 approaches or begins entering garage 4. Control apparatus 92 sends a signal which is received by a remote control receiver 94 on apparatus 2. The remote control receiver 94 then switches apparatus 2 from a standby mode to an active mode. An indicator lamp 96 (FIGS. 1 and 5) then lights when apparatus 2 is activated, as an indicator to the vehicle operator that the apparatus 2 has received the remote signal and is operating.

Apparatus 2 also includes means for automatically reverting to the standby mode. Referring to FIG. 5, an electronic timer 98 enables the detection and alarm circuits of apparatus 2. Timer 98 is triggered by an input signal from the remote control receiver 94. The electronic timer 98 then sends an output signal enabling the detection and alarm indicator circuits. If no vehicle 6 (FIG. 4D) is detected at the pre-determined vehicle spot within the set time interval provided by timer 98, typically thirty to sixty seconds, the timer 98 shuts off, disabling the detection and alarm circuits, and causing the indicator lamp 96 to go out and the apparatus 2 to "revert" to the "standby" mode. The timer 98 then resets awaiting the next input signal from the remote control receiver 94.

In the active run mode, if a vehicle 6 is detected in the pre-determined vehicle spot, a signal is sent from the pulse counter 85 which resets the electronic timer 98 while apparatus 2 continues to operate for the duration of the alarm interval provided by alarm timer 86. After alarm timer 86 times out and alarm means 53 shuts-off, apparatus 2 reverts to the "standby" mode.

In the setup mode, electronic timer 98 is overridden in order to enable the cursor position control timer 76 to be fine tuned without power interruption. This is accomplished by placing a timer reset override gate 100 between the pulse counter 85 and electronic timer 98. Timer reset override gate 100 has means to only produce an output signal when no signals are present at either of its input terminals. In the setup mode only, the low frequency oscillator 72 continually supplies an input signal to the timer reset override gate 100, thus preventing a signal from the pulse counter 85 from reaching the electronic timer 98. In the run mode, the signal from the low frequency oscillator 72 is cut off, thus allowing the timer reset override gate 100 to pass the signal from the pulse counter 85 to the electronic timer 98.

Other means for remotely activating apparatus 2 could be used. For example, a typical garage door opener transmitter, contained within vehicle 6, could be used to simultaneously activate the garage door opener and apparatus 2. This can be accomplished by various means. For example, apparatus 2 could be equipped with a radio frequency receiver tuned to the garage door opener transmitter frequency. When the garage door opener is activated, by remote transmitter signal from within vehicle 6, the apparatus 2 radio frequency receiver responds to the same signal triggering the electronic time 98. Moreover, it would also be possible, and within the scope of this invention, to have a garage door opener transmitter with two separate controls and the capability to transmit two separate frequencies allowing the garage door opener and apparatus 2 to be activated independently or simultaneously using the same remote control transmitter.

In another example, a photoelectric sensor (not shown) could be mounted adjacent to, and in the field of view of, the garage door opener light contained as part of the garage door opener. This sensor would be hard-wired to apparatus 2. When the garage door opener is activated, either by a remote transmitter signal from within vehicle 6, the garage door opener light activates causing the photoelectric sensor to send an output signal triggering the electronic timer 98. The photoelectric sensor circuit is designed to respond to rapid changes in light levels, thus eliminating false triggering due to natural light changes.

In yet another example, it would be possible to interface apparatus 2 to an intelligent home control module having the capability to respond to signals received from the garage door opener transmitter contained within vehicle 6. In this case, the apparatus would be connected directly to the home control module which is connected directly to normal AC line current. When the garage door opener is activated by a remote transmitter signal from within vehicle 6, the home control module simultaneously receives the same transmitter signal sending an output signal triggering the electronic time 98. Thus, using a common remote control solves the problem of having a separate remote control for each device, and has the added benefits of more convenient operation and lower product and maintenance costs for the end user.

Moreover, it would also be possible and within the scope of this invention to operate apparatus 2 continuously in the active mode and to delete the standby mode entirely. In this event, apparatus 2 would have oscillator 72 enabled for continuous pulse generation. This would eliminate the need for the remote control apparatus 92, remote control receiver 94, electronic timer 98, and the timer reset override gate 100.

Whenever vehicle 6 is detected in the pre-determined vehicle spot, the alarm means 53 (FIG. 5) energizes for a brief one-shot timed interval and then latches. The alarm means 53 will not reset and retrigger until the alarm timer 86 no longer receives an input signal from the pulse counter 85 indicating that vehicle 6 has moved out of the pre-determined vehicle spot 24. This avoids a retriggering alarm loop due to continual operation of apparatus 2 when vehicle 6 is parked in the pre-determined vehicle spot. This alternative embodiment of continuous operation of apparatus 2 is best suited for applications, such as loading docks, where multiple vehicles may use the same Vehicle Positioning Apparatus 2, and where such vehicles frequently arrive and depart.

The Operation of Apparatus 2

Apparatus 2 according to this invention has numerous advantages. It is easy to install and does not obstruct the garage interior in any meaningful way. The ultrasonic pulse and echo detection method reliably detects vehicle position and does not depend upon photoelectric vehicle detection sensing which can be interfered with by inconsistent reflective surface qualities on the vehicle. Thus, the operator of vehicle 6 can use apparatus 2 to tell him or her when vehicle 6 is precisely located in the pre-determined vehicle spot 24 to allow the operator to bring the vehicle to a halt.

Moreover, the actual pre-determined vehicle spot 24 can be easily changed by the operator by repeating the setup procedure with vehicle 6 parked in a new location. Housing 30 can be rotated easily by hand to point directly at vehicle 6 in this new location, but otherwise no physical movement of apparatus 2 is required. Thus, apparatus 2 is versatile in use and is not limited for use with a particular pre-determined vehicle spot or target area.

Furthermore, apparatus 2 can be easily activated by remote control from within vehicle 6 as it approaches or enters the target area. Moreover, the garage door opener transmitter can be used to activate apparatus 2. Thus, apparatus 2 is convenient and simple to operate.

The various timing, memory, input/output interfaces, and logic functions embodied in apparatus as described herein could be automatically performed by one, or more, programmed microprocessor(s), and would still be covered by the present invention.

In addition, the rotatable housing 30 of apparatus 2 would be useful regardless of the kind of vehicle sensing means used as it is easily adjustable without intruding into the garage space. However, this advantage is present for a vehicle sensing means that is basically self-contained in the housing.

Various other modifications of this invention will be apparent to one skilled in the art. Thus, the scope of this invention is to be limited only by the appended claims.

We claim:
1. Apparatus for helping an operator of a movable vehicle to park or otherwise position that vehicle at a desired pre-determined spot within a target area comprising a parking stall, which comprises:
   (a) at least one alarm which s discernible to the vehicle operator when the alarm is actuated; and
   (b) means for actuating the alarm when the vehicle reaches the pre-determined spot as the vehicle is being driven into the target area to allow the operator to stop the vehicle when the vehicle is located approximately at the pre-determined spot, the alarm actuating means including:
      (i) means for generating a succession of pulses of sound energy and for directing the sound pulses into the target area and towards the vehicle as the vehicle is being driven towards the pre-determined spot, wherein the pulse generating means generates pulses at a frequency such that the vehicle when driven into the target area at a parking speed does not move a significant distance forwardly between successive sound pulses;
      (ii) means for detecting sound pulse echoes which are reflected from the target area including sound pulse echoes reflected from the vehicle being moved into the target area by the operator; and
      (iii) control means responsive to the reflected sound pulse echoes received by the detecting means for determining when the vehicle has reached the pre-determined spot within the target area and for simultaneously actuating the alarm in that event to alert the operator that movement of the vehicle should be stopped to locate the vehicle approximately at the pre-determined spot.

2. Apparatus as recited in claim 1, wherein the control means includes:
   (a) means for storing a reference pulse/echo time corresponding to the time that it takes a sound pulse to travel from the generating means to the vehicle and then to the detecting means from the vehicle when the vehicle is located at the pre-determined vehicle spot;
   (b) means for monitoring the actual pulse/echo times for sound pulses produced by the generating means and actual sound pulse echoes received by the detecting means as the vehicle is being driven into the target area and towards the pre-determined vehicle spot; and
   (c) means for generating an alarm output signal to activate the alarm when the actual pulse/echo time monitored for at least one sound pulse is equal to the reference time.

3. Apparatus as recited in claim 2, wherein the alarm output signal generating means includes counter means for requiring the actual pulse/echo times for a plurality of successive sound pulses to be equal to the reference time before the alarm output signal is generated, thereby to minimize inadvertent actuation of the alarm.

4. Apparatus as recited in claim 3, further including timer means for turning the alarm off a pre-determined time interval after its actuation of said timer means.

5. Apparatus as recited in claim 4, wherein the timer means comprises a one-shot timer which remains latched while the vehicle remains in the pre-determined vehicle spot and which is reset when the vehicle leaves the pre-determined vehicle spot.

6. Apparatus as recited in claim 2, wherein the monitoring means comprises:
  (a) pulse receiving means operatively connected to the pulse detecting means for generating an output signal upon receipt of a sound pulse by the detecting means; and
  (b) means for intermittently operating the pulse receiving means after the generation of each sound pulse for a pre-determined time window which includes the reference pulse echo/time, whereby receipt of an actual sound pulse echo by the detecting means during this time window indicates an actual pulse/echo time that is equal to the reference pulse/echo time and receiving no echo during said time window is an indication of actual pulse/echo times that are different than the reference pulse/echo time.

7. Apparatus as recited in claim 6, wherein the intermittent operating means further includes:
  (a) timing signal means for generating a plurality of initiate transmit signals at a pre-determined rate;
  (b) wherein the timing signal means is operatively coupled to the pulse generating means for creating a sound pulse when each initiate transmit signal is applied to the pulse generating means;
  (c) wherein the timing signal means is operatively coupled to a time delay means which is activated by each initiate transmit signal and which supplies an output signal delayed from the receipt of the initiate transmit signal by approximately the amount of the reference pulse/echo time; and
  (d) wherein the time delay means is operatively coupled to the pulse receiving means for operating the pulse receiving means upon receipt of each output signal from the time delay means for the pre-determined time window.

8. Apparatus as recited in claim 7, wherein the pulse generating means and the pulse receiving means comprises a single transducer for converting electrical impulses to sound pulses and vice versa.

9. Apparatus as recited in claim 7, wherein the time delay means is selectively adjustable for changing the reference pulse/echo time to adjust to different pre determined vehicle spots.

10. Apparatus as recited in claim 1, further including:
  (a) a power source for energizing the alarm and alarm actuating means; and
  (b) means for switching the alarm and alarm actuating means between a standby mode in which the alarm and alarm actuating means are disabled and an active mode in which the alarm and alarm actuating means are enabled for operation thereby, the switch means further including means for receiving a remotely generated signal to switch from standby to active mode as the vehicle enters the target area and approaches the pre-determined vehicle spot.

11. Apparatus as recited in claim 10, further including manually operable transmitting means suited to be carried in the vehicle for transmitting the remotely generated signal to the switch means.

12. Apparatus as recited in claim 10, further including timer means for causing the switch means to revert to standby mode if the alarm is not activated within a preset time interval following the initiation of the active mode.

13. Apparatus as recited in claim 12, further including mode selector means for overriding the timer means for allowing continuous operation in the active mode for operating the ultrasonic pulse generating means and the ultrasonic pulse detecting means when the vehicle is pre-positioned in the pre-determined vehicle spot to allow the pre-determined vehicle spot to be selectively input by the operator into the control means.

14. Apparatus as recited in claim 1, wherein the pulse generating means and pulse detecting means generate and receive ultrasonic sound pulses respectively.

15. Apparatus as recited in claim 1, wherein the alarm actuating means is carried in a housing mounted on a support surface adjacent to the target area, wherein the housing is pivotal relative to the support surface to adjust the direction of the sound pulses relative to the target area.

16. Apparatus as recited in claim 15, wherein the housing further carries the alarm.

17. Apparatus as recited in claim 1, wherein the alarm includes a visual alarm that is visible to the vehicle operator.

18. Apparatus as recited in claim 17, wherein the alarm further includes an audible alarm that may be heard by the vehicle operator.

19. Apparatus for helping an operator of a movable vehicle to park or otherwise position that vehicle at a desired pre-determined spot within a target area comprising a parking stall, which comprises:
  (a) at least one alarm which is discernible to the vehicle operator when the alarm is actuated;
  (b) transducer means for both generating pulses of sound energy and for receiving echoes of such pulses from objects in its path, wherein the transducer means is located to direct such sound pulses into the target area and to receive echoes from the target area; and
  (c) control means coupled to the transducer means and to the alarm for activating the alarm when the vehicle reaches the pre-determined vehicle spot as the vehicle is being driven into the target area to allow the operator to stop the vehicle when the vehicle is located approximately at the pre-determined spot, wherein the control means includes:
    (i) means for storing a reference pulse/echo time corresponding to the time that it takes a sound pulse to travel from the transducer means to the vehicle and then back to the transducer means when the vehicle is located approximately at the pre-determined spot within the target area;
    (ii) means for intermittently pulsing the transducer means to generate a succession of sound pulses, wherein the pulse generating means generates pulses at a frequency such that the vehicle when driven into the target area at a parking speed does not move a significant distance forwardly between successive sound pulses;

(iii) pulse receiving means operatively connected to the transducer means for generating an output signal upon receipt of a sound pulse echo by the transducer means;

(iv) means for intermittently operating the pulse receiving means to listen for said sound pulse echo after the generation of each sound pulse for a pre-determined time window which includes the reference pulse echo/time, whereby receipt of a said sound pulse echo during this time window indicates an actual pulse/echo time that is equal to the reference pulse/echo time and receiving no sound pulse echo during this time window is an indication of actual pulse/echo times that are different than the reference pulse/echo time; and (v) means for generating an alarm output signal to activate the alarm simultaneously whenever the actual pulse/echo time monitored for at least one sound pulse is equal to the reference time to alert the operator that movement of the vehicle should be stopped to locate the vehicle approximately at the pre-determined spot.

20. Apparatus for helping an operator of a movable vehicle to park or otherwise position that vehicle at a desired pre-determined spot within a target area comprising a parking stall, which comprises:

(a) a housing which carries:
  (i) at least one alarm which is discernible to the vehicle operator when the alarm is actuated; and
  (ii) vehicle detection means for detecting when the vehicle reaches the pre-determined spot, the vehicle detection means being self-contained on the housing and being directed towards the target area comprising an alarm activating means, wherein the alarm activating means comprises:
  means for generating sound energy and for directing that sound energy into the target area;
  means for receiving reflections of the sound energy from vehicles being moved into the target area towards the pre-determined spot within the target area; and
  control means responsive to the sound energy reflections received by the receiving means for activating the alarm when the vehicle reaches the pre-determined spot;

(b) a mounting bracket which may be secured to a support structure comprising a vertical surface, the housing forming an angle of inclination relative to the vertical surface; and (c) means for rotatably mounting the housing relative to the mounting bracket for rotation about a substantially horizontal axis to vary the angle of inclination of the housing relative to the vertical surface to allow adjustment of the vehicle detection means relative to the target area such that the sound energy is properly directed at the vehicle from the generating means and back from the vehicle to the receiving means.

21. A method of assisting an operator of a movable vehicle in locating that vehicle at a desired pre-determined spot within a target area comprising a parking stall, which comprises the steps of:

(a) generating a succession of pulses of sound energy, wherein a pulse generating means generates pulses at a frequency such that the vehicle when driven into the target area at a parking speed does not move a significant distance forwardly between successive sound pulses;

(b) directing the sound pulses at the target area in which the pre-determined spot is contained as the vehicle is being driven into the target area at the parking speed and towards the pre-determined spot;

(c) detecting pulse echoes which are reflected back from the target area including pulse echoes reflected back from the vehicle being moved into the target area;

(d) determining from the reflected echoes whether the vehicle has reached the pre-determined vehicle spot; and (e) activating an alarm discernible to the operator simultaneously whenever the determining step has found that the vehicle has reached the pre-determined spot to alert the operator that movement of the vehicle should be stopped to locate the vehicle at the pre-determined spot.

22. A method as recited in claim 21, wherein the pulses of sound energy comprise ultrasonic sound pulses.

23. Apparatus for helping an operator of a movable vehicle to park or otherwise position that vehicle in a desired pre-determined position within a target area, which comprises:

(a) at least one alarm which is discernible to the vehicle operator when the alarm is actuated; and (b) means for actuating the alarm when the vehicle reaches the pre-determined vehicle position, the alarm actuating means including:
  (i) means for generating a succession of pulses of sound energy and for directing the sound pulses into the target area and towards the pre-determined vehicle position;
  (ii) means for detecting sound pulse echoes which are reflected from the target area including sound pulse echoes reflected from the vehicle being moved into the target area by the operator; and
  (iii) control means responsive to the reflected sound pulse echoes received by the detecting means for determining when the vehicle has reached the pre-determined vehicle position and for actuating the alarm in that event, wherein the control means includes:
  means for storing a reference pulse/echo time corresponding to the time a sound pulse travels from the generating means to the vehicle and then to the detecting means from the vehicle when the vehicle is located at the pre-determined vehicle position;
  means for monitoring actual pulse/echo times for sound pulses produced by the generating means and actual sound pulses echoes received by the detecting means as the vehicle is being driven into the target area and towards the pre-determined vehicle position; and
  means for generating an alarm output signal to activate the alarm only when the monitoring means detects a plurality of consecutively received actual pulse/echo times which are equal to the reference time following a plurality of consecutively generated successive sound pulses, thereby to minimize inadvertent actuation of the alarm.

* * * * *